United States Patent [19]

Barnette

[11] 3,761,554
[45] Sept. 25, 1973

[54] METHOD OF MAKING PLASTIC ARTICLES WITH A SUBSTANTIALLY ENVELOPED CORE

[76] Inventor: Stanley Ronald Barnette, 90 Cherokee St., Miami Springs, Fla.

[22] Filed: Oct. 27, 1969

[21] Appl. No.: 869,950

Related U.S. Application Data

[60] Continuation of Ser. No. 609,642, Jan. 16, 1967, which is a division of Ser. No. 251,260, Jan. 14, 1963, Pat. No. 3,298,894, which is a continuation-in-part of Ser. No. 808,599, April 24, 1959, Pat. No. 3,072,973.

[52] U.S. Cl............... 264/69, 264/73, 264/108, 264/254, 264/255, 264/274, 264/278
[51] Int. Cl............................................. B29d 3/00
[58] Field of Search............................. 264/69, 254

[56] References Cited
UNITED STATES PATENTS

| | | | |
|---|---|---|---|
| 2,632,922 | 3/1953 | Kish | 264/275 X |
| 2,682,111 | 6/1954 | Kish | 264/275 X |
| 3,046,610 | 7/1962 | Grunin | 264/108 UX |
| 3,072,973 | 1/1963 | Barnette | 264/271 X |
| 3,126,429 | 3/1964 | Saffir | 264/255 X |
| 3,328,499 | 6/1967 | Barnette | 264/108 |
| 2,856,635 | 10/1958 | Gerson et al. | 264/73 |
| 2,935,320 | 5/1960 | Chupa | 264/278 X |

Primary Examiner—Robert F. White
Assistant Examiner—Allen M. Sokal
Attorney—Myron B. Kurtzman and Fred L. Denson

[57] ABSTRACT

A monolayered plastic casting means for substantially enveloping and interlocking a substantially rigid core formed means utilizing an isotropic producing principle by providing a cavity space making element means, said element means utilized to permit substantially equal quantities of curable material to be formed on the front and back face sides of said core means, and wherein said curable material has at least one side that has a deep dimensional decorative surface appearance.

12 Claims, 46 Drawing Figures

PATENTED SEP 25 1973 3,761,554

INVENTOR.
BY Stanley Ronald Barnette

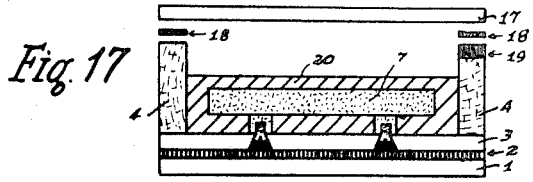
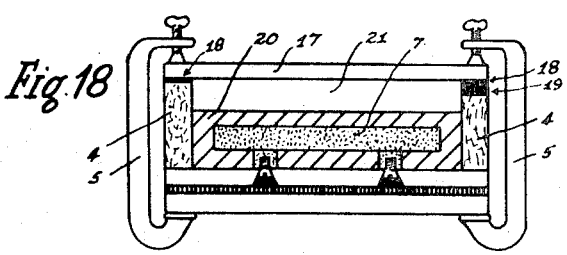
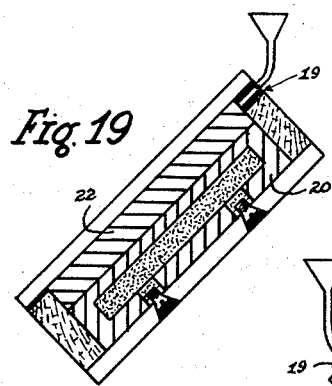
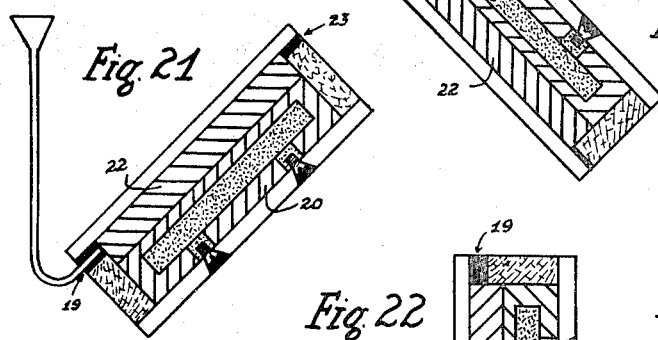
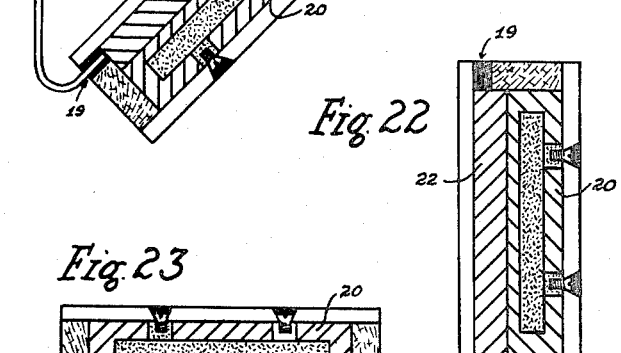
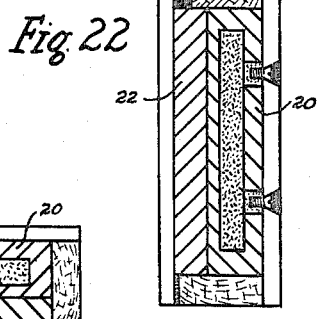
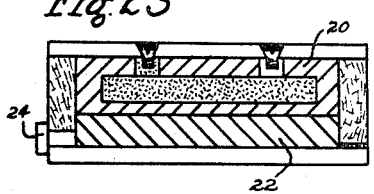
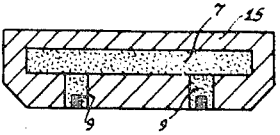
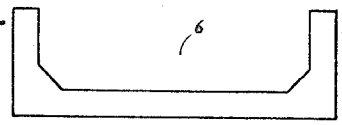
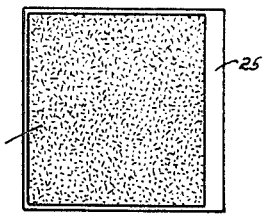
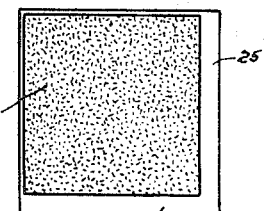
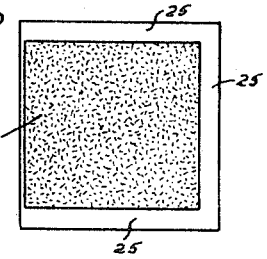
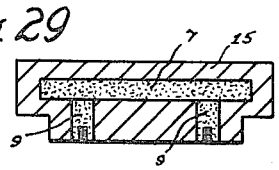

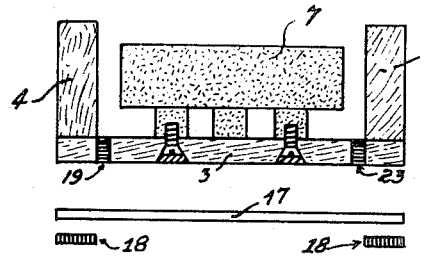
Fig.30
Fig.31
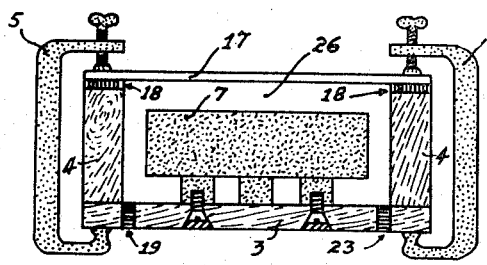
Fig.32
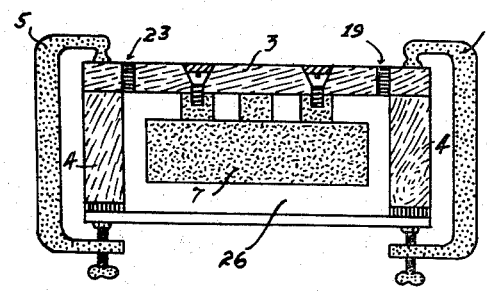
Fig.33
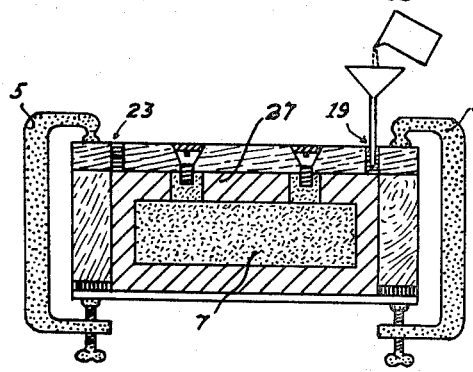
Fig.34
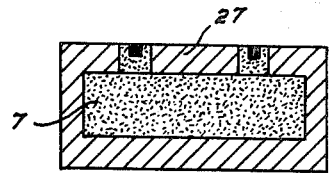
Fig.35
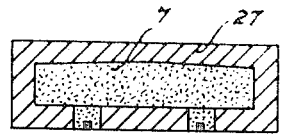
Fig.36
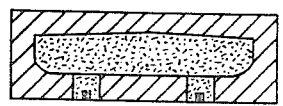
Fig.37
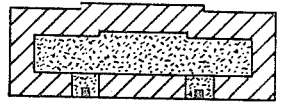
Fig.38
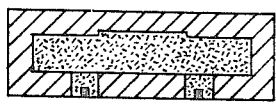
Fig.39
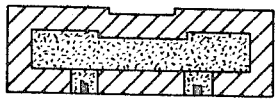
Fig.40
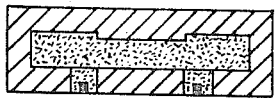
Fig.41
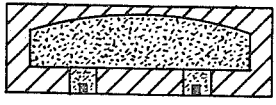
Fig.42
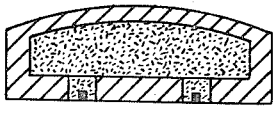
Fig.43
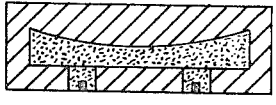
Fig.44
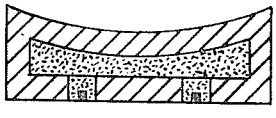
Fig.45
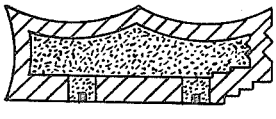
Fig.46

METHOD OF MAKING PLASTIC ARTICLES WITH A SUBSTANTIALLY ENVELOPED CORE

This application is a streamlined continuation of copending application Ser. No. 609,642 filed Jan. 16, 1967 which in turn was a divisional of the then copending application Ser. No. 251,260 filed Jan. 14, 1963 and now U.S. Pat. No. 3,298,894 issued Jan. 17, 1967 which in turn was a continuation-in-part of the then copending application Ser. No. 808,599 filed Apr. 24, 1959, and now U.S. Pat. No. 3,072,973, issued Jan. 15, 1963.

This invention relates to a process for producing plastic articles, namely, structural panels, table tops, flooring, roofing, furniture, window sills, walls, etc., having a structural core substantially enveloped in said plastic.

Another object of this invention is to provide structural cores readily shaped and constructed so as to be interlocked into the plastic body of the article that surrounds said core.

It is another object of this invention to produce articles having a plastic body self-bonded and interlocked to the core, having a unitary, integral and seamless plastic edge, with any desired exterior surface finish and having a deep three-dimensional decorative effect visible through the plastic, said core providing rigidity, light-weightedness, acoustical properties, shock-proof properties, insulation properties, etc.

The invention relates to a method of forming articles of laminated plastic by a casting process which includes having the articles in any desired shape or form and with plain or decorative surfaces and/or plain or decorative embedments.

The invention contemplates the method of enveloping a core stock whereby to attain a product having bulk without excess weight and with full strength characteristics.

The invention also relates to a method of cast laminating pearlized, plain, or patterned decorative sheeting and enveloping a core stock material so as to achieve a structural surfacing material and particularly to such methods utilizing plastic.

Another object of the invention is to provide a method wherein the cast laminated material is provided with an extremely smooth or embossed effect, relatively hard surface.

A further object of the invention is to provide a method wherein the core material is completely surrounded by plastic and adds materially to the strength of the finished itemed product.

Finally this invention relates to articles of manufacture in the form of a slab comprising a plastic body substantially enveloping a core, produced by the methods herein disclosed.

In accordance with these and other objects which will become apparent hereinafter, the instant invention will now be described with reference to the accompanying drawings illustrating a preferred embodiment thereof:

In the drawings:

FIGS. 17 through 23 are cross-sectional views of the steps involved in order to produce an article with one finished surface.

FIG. 24 is a cross-sectional view of an article having a plastic beveled edge produced in the mold illustrated in cross-sectional view in FIG. 25.

FIGS. 26, 27 and 28 are top views of different positions of a core into the mold in order to form square articles with one, two, or three integral edges at the corresponding sides.

FIG. 29 is a cross-sectional view of an article having a special edge contour.

FIGS. 30 thru 34 are cross-sectional views of the steps involved in order to produce an article with at least one finished surface.

Figure 9:
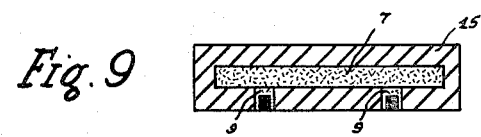
FIG. 9 is a cross-sectional view of an article produced according to this invention.

FIG. 35 is a cross-sectional view of an article produced by means of the steps depicted in FIGS. 30 thru 34 which corresponds to FIG. 9, but in a reversed position.

FIGS. 36 thru 46 are cross-sectional views of some different cores readily enveloped and having different shapes and/or different surface finishes.

Figure 1:
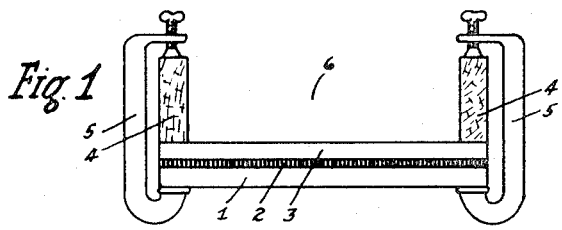
FIGS. 1 and 2 are cross-sectional views of molds that may be employed in the practice of this invention.

With reference to the drawings, the instant invention will now be described with reference to an eaxample. FIG. 1 depicts a mold assembly comprising a leveled platform 1, a metal foil blanket 2, a mold base 3 and mold walls 4. The mold walls and the mold base are tightly secured by means of clamps 5 to form the open mold 6. The open mold 6 in some instances may be replaced by a one section cavity mold illustrated in FIG. 2, whenever standard sizes are manufactured.

The simple mold forms illustrated in 4 of FIG. 1 are of the Melamine (Formica covered plywood) type as they can be very readily shaped to provide the desired size walls contours of the mold.

The mold base 3 indicated in FIG. 1, is a glass or Melamine type, and a releasing compound for the mold base and mold walls must be used. In the event that a polyester film is used to form the mold base and or the mold walls, no coating is necessary as this material in itself sets as a ready release.

Figure 2:
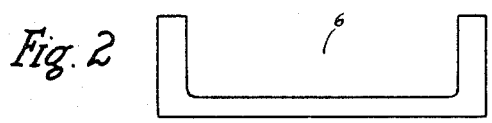

The one section cavity mold illustrated in FIG. 2 includes rubber, metal, glass or plastic material and in the case of rigid materials, the mold walls will form with the mold base an angle over 90° to permit the removal of the article from the mold.

Figure 3:
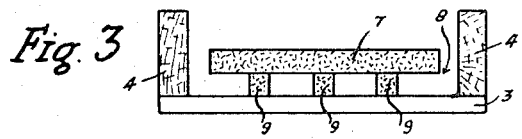

Referring to FIG. 3 an example of an article produced by this method will be illustrated step by step through the succeeding illustrations, consisting in a 48 inch diameter table top.

A ¾ inch thick structural core 7 as in FIG. 3 is provided with means to raise said core from the mold base in order to create a predetermined space cavity underneath said core. Said means may consist of elements attached to the core surface that faces the base mold, such as nails, screws, pegs, stoppers, dowels, etc. In order to maintain and secure a leveled core these elements must be of equal length, properly disposed and consist at least of 3. As soon as the core 7 with attached elements 9 is positioned into the open mold with the supporting elements laying on the mold base 3 and centered, means are provided to keep said core in the said position and to maintain the supporting elements 9 in close contact with the mold base. The resultant cavity 8 is limited by the edge and the portion of the core bottom not covered by the attached elements, by the attached elements and by the corresponding sections of the mold.

Figure 4:
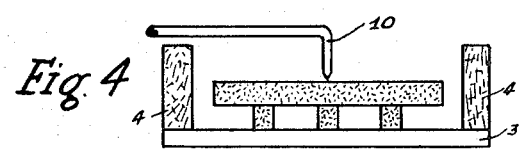
Figure 5:
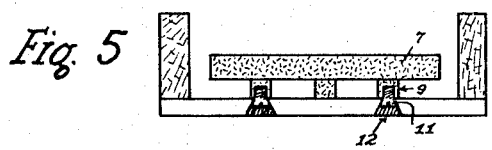
FIGS. 5 through 8 are cross-sectional views of the basic steps to substantially envelope a core.

The means to secure the core in position may consist of an upper bar 10 as depicted in FIG. 4 or screws 11 illustrated in FIG. 5 secured to the bottom of the supporting elements through machined holes 12 in the mold base 3, said means removable at any desired step of the operation and the choice of one system or any other being of no consequence.

In order to substantially envelope the core two different procedures may be followed which are illustrated in FIGS. 6 through 9.

For the example of the 48 inch diameter table top a mixture is prepared consisting of: four quarts of polyester resin, one-third quart of Styrene, one dram of Cobalt Napthenate (6 percent Cobalt) and three ounces of Black Polyester paste.

Figure 6:
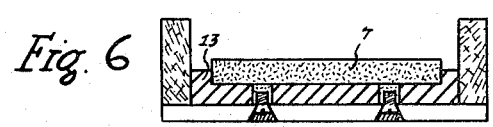

In the first procedure the substantial envelopment is accomplished in two steps:

One half of the mixture is placed in a separate container and mixed with 1 percent of Methyl Ethyl Ketone Peroxide (60 percent), stirred and poured into the cavity or on top of the core, so that the catalyzed mixture 13 as depicted in FIG. 6 rises to a partial depth of the mold and permeates a portion of the edges of the core.

Figure 7:
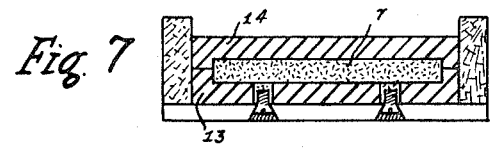

After this first layer hardens to a certain degree the remaining half of the mixture is mixed with 1 percent of Methyl Ethyl Ketone Peroxide (60 percent), stirred and poured on top of the first layer 13 and leveled to the edges, completely covering the edges and top surface of the core as indicated in 14 FIG. 7.

As soon as this last mixture is cured the article may be removed from the mold and will have the following characteristics: the plastic surface and edges integral, the self-bonding between both layers is perfect, the plastic is self-bonded to the core and no seam will be evident at the edges because the properties of pigment and other materials is the same for both layers. This article is illustrated in cross-sectional view in FIG. 9.

The method involves what I call cast laminating in that I produce the completed articles by a series of pours in such manner that each layer becomes integral with a preceding layer, instead of merely a series of independent sheets or common laminations merely each individually bonded to the other.

Figure 8:
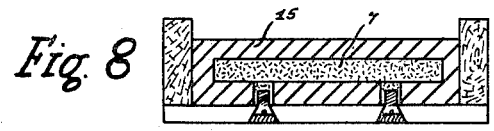

The second procedure to substantially envelope the core is depicted in FIG. 8. This is accomplished in one step using the total amount of mixture to which 1% of Methyl Ethyl Ketone Peroxide (60 percent) is added, stirred and poured into the cavity or on top of the core and leveled to the edges, completely covering the top of the core and filling the cavity as indicated in 15.

After cured and removed from the mold the article will appear to be the same shown in FIG. 9 in a cross-sectional view.

It should be noted that in order to avoid any bubble or entrapped air underneath the core or edge contour, the pouring must be made from one side right over the cavity formed between the edge of the core and the mold walls so that the resin is permitted to flow freely into, through and around the cavity following two different paths and displacing the air until said resin completely covers the cavity to the desired level.

The article produced by the described methods will have one even plastic surface with one color, black in the example.

If a decorative effect is desired to be visible through the plastic surface, this may be accomplished by means of the following variations:

a. Decorative effect formed in the liquid resin mixture that substantially envelopes the core.
b. Decorative effect formed in at least one additional layer of liquid resin mixture formed on top of the plastic that substantially envelopes the core.

Figure 10:
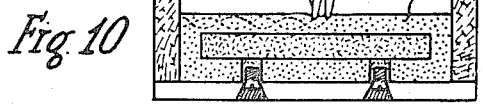
FIGS. 10 through 16 are cross-sectional views illustrating the steps of decorating the liquid resin and enveloping the core to produce an article with one even surface.

The decorative effect can be formed in the liquid resin that substantially envelopes the core by means of any of the following examples:

The first example illustrated in FIG. 10 consists in adding to a predetermined amount of liquid catalyzed resin one amount of pearlessence pigment, stirring, and pouring into the mold as described in FIG. 8. As soon as the resin mixture covers the top surface of the core by hand means the liquid mixture is agitated in a combing motion to disperse and orient the pearlessence pigment forming a pattern of choice, suspending this combing operation as soon as the increase in the resin viscosity indicates gel stage is reached permitting the pattern to remain fixed into the resin.

Figure 11:
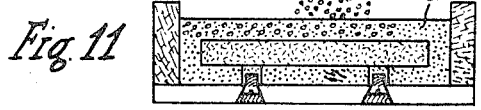

The second example illustrated in FIG. 11 consists in pouring liquid catalyzed modified resin as indicated in FIG. 8 and as soon as the top surface of the core is covered with resin by hand means introducing mother of pearl flakes into said liquid resin forming a desired pattern of choice before the increase in the resin viscosity indicates that the gel stage is reached and which proper timing can be controlled by means of accelerator-and-catalyst-to-resin-ratios and operating temperature.

Figure 12:
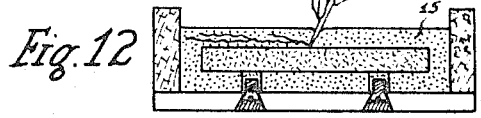

The third example is illustrated in FIG. 12 wherein by means of a fine pointed instrument that has previously been slightly impregnated or tipped with black polyester paste, black veins are formed in the liquid catalyzed resin mixed with a pearlessence pigment to simulate a marble surface.

Whenever a deeper three-dimensional decorative effect is desired variations may be used by means of additional layers formed on the plastic that substantially envelopes the core.

Figure 13:
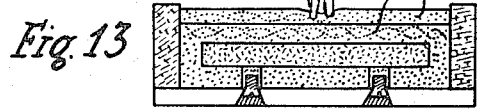
Figure 14:
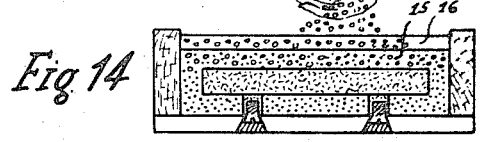

One of these variations consists in forming the first decorative layer in the liquid mixture that covers the top surface of the core as explained before and is permitting this layer to cure, adding additional amounts of liquid resin and forming on each of these layers the desired effect or pattern, following the techniques of adding to the mixture or introducing into the mixture the decorative media as specified in the descriptions of FIGS. 10 through 12. The only precaution is to permit each layer to harden to a certain degree before adding an additional layer of liquid resin. This is depicted in FIGS. 13 and 14, wherein the first decorative effect is formed in the mixture 15 that covers the top of the core and the secondary decorative effect is formed in the additional liquid layer 16.

Figure 15:
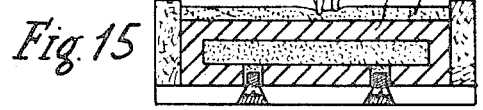
Figure 16:
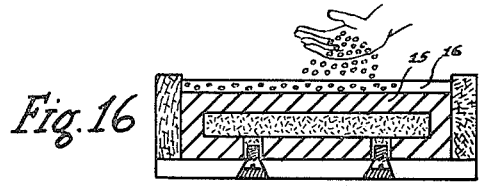

Another variation consists in covering the top surface of the core with opaque pigmented liquid resin to provide the background for the decorative effect and the masking medium for the core, forming the deep three-dimensional decorative effect in additional amounts of liquid resin poured in successive order on top of the opaque layer that covers the top surface of the core. This variation is illustrated in FIGS. 15 and 16, depicting one decorative layer 16 formed by means of dispersing the pearlessence pigment mixed in the resin or by means of introducing the mother of pearl flakes into the resin respectively. As stated before, the only necessary precaution is to permit each layer to harden to a certain degree before adding an additional layer of liquid resin.

Following the described procedures the finished article when removed from the mold will have one even and flat surface, its flatness depending on the viscosity of the resin or the amount of monomer or thinner used.

Sometimes in order to obtain a smoother surface this may be achieved simply by adding a small amount of melted paraffin in styrene. This surface may also be sanded, polished or buffed.

In order to produce any desired and perfect finished surface of the article, the additional steps to be followed are illustrated in FIGS. 17 through 23.

This is accomplished by means of fitting on top of the existing mold assembly, after the clamps are removed, a top cover plate the underside of which conforms to the desired exterior surface finish of the article and a gasket to form a closed mold. This is depicted in FIG. 17 wherein the top cover plate 17 and the gaskets 10 are in position to be fitted on top of the existing mold assembly described in FIG. 1. In FIG. 18 the closed mold is already formed with the clamps 5 tightly securing the top cover plate 17 and the gaskets 18 against the mold walls 4, forming a cavity 21 limited by the top surface of the last cured plastic 20, the mold walls of the existing mold 4, the gaskets 18 and the underside of the top cover plate 17. The slot 19 has previously been machined in the mold walls 4 to provide means to introduce the liquid resin into said cavity and to permit the air to escape through said opening.

Then the entire mold assembly is tilted to an appropriate position so as to permit to introduce the liquid catalyzed resin 22 into the cavity 21 either from the top or from the bottom, as illustrated in FIGS. 19 through 22. In order to facilitate the entrapped air to escape from the cavity, the slot 20 must be properly shaped and located and also the mold assembly can be rotated.

After the cavity is filled and no air bubbles are present the mold may be stored for cure in any desired position, one example illustrated in FIG. 22, but preferably in a horizontal position depicted in FIG. 23 so as to guarantee that the liquid resin remains on the face of the top cover plate, plugging the slot by means of plug 24. This position permits better results, because this last plastic layer formed in opposite direction to the preceding layers when cured will provide isotropic properties, equal opposite stresses and an extremely hard plastic surface.

In another variation explained in paragraph 8 of page 4, but in order to produce at least one desired surface of the article, using the total amount of mixture of catalyzed polyester resin in one step, the necessary procedure is illustrated in FIGS. 30 thru 34. This is accomplished by means of positioning a structural core 7 on the mold base 3 with means provided to secure said core to the mold base 3, as illustrated in FIG. 30. After the core is in position, a top cover plate 17, the under side of which conforms to the desired exterior surface finish of article, and the gaskets 18, are fitted on top of the existing mold assembly to form a closed mold as indicated in FIG. 31. FIG. 32 depicts the closed mold already formed with clamps 5 tightly securing the top cover plate 17 and gaskets 18 against mold walls 4, forming a cavity 26 limited by the core 7, the mold walls 4 of the existing mold, the gaskets 18 and the under side of the top cover plate 17. The slots 19 and 23 had previously been machined in the mold base 3 to provide means to introduce the liquid resin into said cavity and to permit the air to escape through one or both of said openings.

Then the entire mold assembly is turned as illustrated in FIG. 33 so as to introduce the liquid catalyzed resin into cavity 26. FIG. 34 illustrates the liquid resin 27 being introduced into 19. In order to facilitate the entrapped air to escape from the cavity, slot 23 is provided.

When the cavity is filled and air bubbles are released, the mold may be stored to set, and the article when removed from the mold, will have at least one finished surface as indicated in FIG. 35 wherein the core 7 is substantially enveloped by plastic 27.

The article when removed from the mold will show one perfect finished surface, polished, satin, embossed, raised, sculptured, etched, irregular, etc.

The decorative effect will be visible through the plastic surface and the deep three-dimensional decorative effect will depend on the amount of layers used to produce said effect.

Also, the pigmented plastic portion that masks or covers the core may be totally or partially visible through the plastic surface or not, but very clearly at the edge and at a portion of the back of the article, the edge being self-formed and self-bonded and integral and unitary with the plastic surface, without seams.

Always the back side of the article will show: the portion of plastic that surrounds the elements attached to the core on that side and which width, thickness and shape depends on the size of the attached elements, the length of said elements, the predetermined contour of the mold base and mold walls, of the back contour of the core; and the portion of the elements which were in contact with the mold base not covered by plastic.

In order to improve the appearance of the back of said article, the attached elements may be removed if same were previously coated with a release, or if desiredused to attach plates or other fastening device. Also, it is possible to apply liquid pigmented catalyzed resin, paint or any other medium to cover said portion of the elements.

FIG. 24 illustrates an article with a beveled edge produced with a mold base depicted in FIG. 25.

FIGS. 26, 27 and 28 depicts three top views of different variations in positioning the slab core stock into the mold to have a squared article with one, two or three self-formed edge sides, depending upon their end use which does not require four edges. In such instances the cavity is only formed underneath the core in the selected sides 25.

Finally FIG. 29 illustrates an article produced in a mold having the mold walls shaped accordingly.

FIGS. 36 thru 46 illustrate different examples of substantially enveloped cores using the methods heretofore described.

As examples, articles having a flat surface finish; polished, satin or patterned, are indicated in FIGS. 36, 37, 39, 41, 42 and 44. An article having a raised surface is illustrated in FIG. 38. An article having an engraved surface is illustrated in FIG. 40. Articles having a convex and concave surface are illustrated in FIGS. 43 and 45. FIG. 46 refers to an article having irregular surface and edges as well as a portion of the back side.

In these FIGS. 36 and 46, the cores enveloped show examples of some different shapes or forms of the core as may be used.

What is claimed is:

1. The casting method of producing substantially rigid structural enveloped plastic-core-reinforced articles which comprises:
   a. utilizing a substantially rigid core having at least one supporting element attached to one of its surface sides so as to provide a cavity of predetermined length between the core and the base of an open mold, positioning said core into a shallow open mold, said element having removable means attached to the core and a surface of the mold,
   b. introducing at least one layer of sufficient curable material to fill the mold cavity and cover half of the core,
   c. permitting said curable material to set thereby interlocking the core into the cured material,
   d. utilizing a mold cover, the underside of which conforms to the desired exterior surface finish of the article and, to provide a predetermined space cavity, and inverting the mold,
   e. introducing sufficient curable material to fill the remaining cavity and cover the balance of the core,
   f. permitting the curable material to cure,
   g. removing the article from the mold.

2. A method of producing an article having a cast plastic body which substantially and equally envelops a core comprising the steps of:
   a. providing a mold having a base and wall
   b. providing a core having spacing elements on the underside and an undercut about its periphery edge
   c. positioning said core upon said base and spaced from said mold wall with the undercut edge facing said base
   d. introducing into said mold in a quantity sufficient to cover the upper core face and periphery edge, at least one layer of core masking material, said material being polymerizable and gellable liquid mixture having at least one amount of at least one kind of orientable media added thereto
   e. dispersing and orienting said orientable media by agitating said liquid mixture at least partially downward from the upper liquid surface to achieve a desired pattern
   f. suspending said dispersing and orienting operation when the increase in viscosity of said liquid indicates that the gel stage is reached, permitting the pattern to remain fixed in the resin
   g. permitting said core masking material to harden, and
   h. removing the finished article from the mold.

3. The method of claim 2 which includes the polymerizable liquid being transparent.

4. The method of claim 2 which includes the orientable media being colored.

5. The method of claim 4 which includes the colored orientable media being pigment.

6. The method of claim 5 which includes the pigment media being introduced in the liquid by means of an instrument in forming a simulated marble effect.

7. The method of claim 5 whereby the polymerizable liquid mixture includes a filler.

8. The method of claim 2 which includes a film being used to form at least the surface of the article.

9. A method of claim 2 wherein the core masking material forms an integral shaped edge.

10. A method of claim 9 wherein the integral shaped edge is formed by the wall of the mold.

11. A method of claim 2 wherein the curable material contains a paraffin.

12. A method of claim 2 wherein the exterior face surface is further fabricated and finished.

* * * * *